(12) United States Patent
Tsuji et al.

(10) Patent No.: US 9,075,375 B2
(45) Date of Patent: Jul. 7, 2015

(54) DRIVING DEVICE AND IMAGE FORMING APPARATUS PROVIDED WITH SAME

(71) Applicant: KYOCERA Document Solutions Inc., Osaka-shi, Osaka (JP)

(72) Inventors: Hirofumi Tsuji, Osaka (JP); Akihiro Yamaguchi, Osaka (JP)

(73) Assignee: KYOCERA Document Solutions Inc. (JP)

( * ) Notice: Subject to any disclaimer, the term of this patent is extended or adjusted under 35 U.S.C. 154(b) by 56 days.

(21) Appl. No.: 14/013,289

(22) Filed: Aug. 29, 2013

(65) Prior Publication Data
US 2014/0064752 A1  Mar. 6, 2014

(30) Foreign Application Priority Data

Aug. 31, 2012 (JP) ................... 2012-191372

(51) Int. Cl.
*G03G 15/00* (2006.01)
*F16H 7/02* (2006.01)
*G03G 15/16* (2006.01)
*F16H 13/02* (2006.01)

(52) U.S. Cl.
CPC .............. *G03G 15/55* (2013.01); *F16H 7/02* (2013.01); *G03G 15/1615* (2013.01); *G03G 15/757* (2013.01); *F16H 13/02* (2013.01)

(58) Field of Classification Search
CPC . G03G 15/757; G03G 15/1516; G03G 15/55; F16H 7/02
USPC ............... 399/36, 167; 474/69, 84, 148, 150
See application file for complete search history.

(56) References Cited

U.S. PATENT DOCUMENTS

| | | | | |
|---|---|---|---|---|
| 4,657,239 A | * | 4/1987 | Ikesue et al. | 271/227 |
| 5,816,970 A | * | 10/1998 | Chae | 474/101 |
| 8,867,963 B2 | * | 10/2014 | Tsuji et al. | 399/167 |
| 2004/0063529 A1 | * | 4/2004 | Mare et al. | 474/109 |
| 2011/0211866 A1 | * | 9/2011 | Hashimoto | 399/119 |
| 2012/0051788 A1 | * | 3/2012 | Tsuji et al. | 399/167 |

FOREIGN PATENT DOCUMENTS

| | | |
|---|---|---|
| JP | 50-144860 | 11/1975 |
| JP | 03-025335 | 2/1991 |

(Continued)

OTHER PUBLICATIONS

Japanese Patent Application No. 2012-191372—Japanese Office Action issued Jan. 20, 2015.

*Primary Examiner* — David Gray
*Assistant Examiner* — Carla Therrien
(74) *Attorney, Agent, or Firm* — Gerald E. Hespos; Michael J. Porco; Matthew T. Hespos

(57) ABSTRACT

A driving device includes a motor, a pulley, a metal belt, a first unit, a second unit, a biasing member and a detector. The motor includes a drive shaft. The pulley includes an output shaft extending in parallel to the drive shaft. The pulley is rotatably supported on the first unit with the output shaft as a rotary shaft and the circumferential surface is arranged at a distance from the drive shaft in a radial direction of the rotation. The second unit supports the motor and is slidable relative to the first unit. The biasing member biases the second unit in a direction to move the drive shaft away from the output shaft in a state where the metal belt is mounted between the drive shaft and the pulley. The detector detects a change in an inter-axial distance between the drive shaft and the output shaft.

18 Claims, 10 Drawing Sheets

(56) References Cited

FOREIGN PATENT DOCUMENTS

| | | |
|---|---|---|
| JP | 05-266557 | 10/1993 |
| JP | 2001-130779 | 5/2001 |
| JP | 2005-350151 | 12/2005 |
| JP | 2006-250236 | 9/2006 |
| JP | 2007-212226 | 8/2007 |
| JP | 2010-017810 | 1/2010 |

* cited by examiner

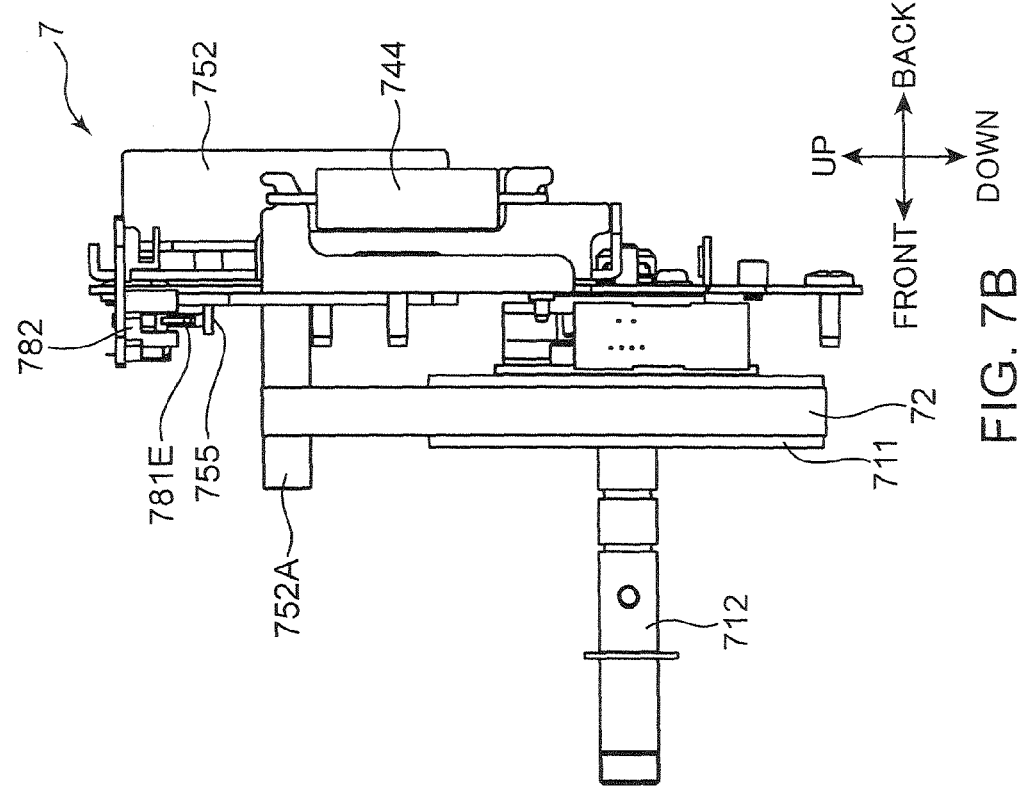
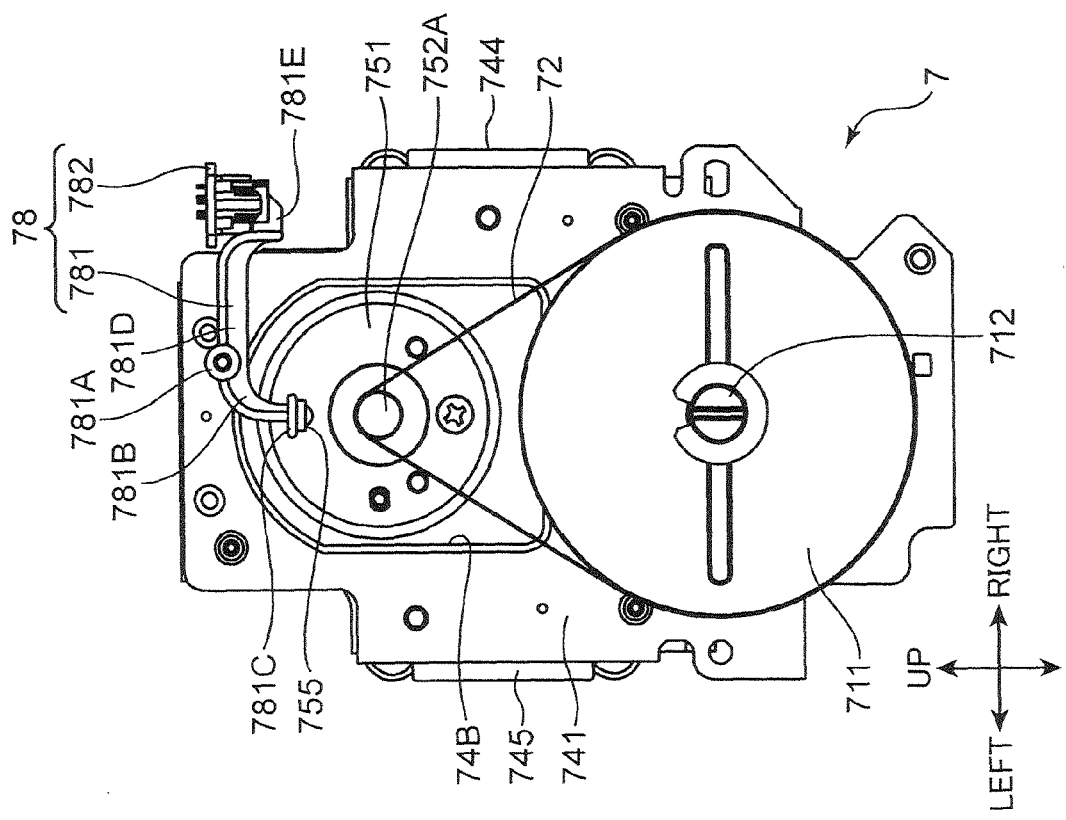
FIG. 7B
FIG. 7A

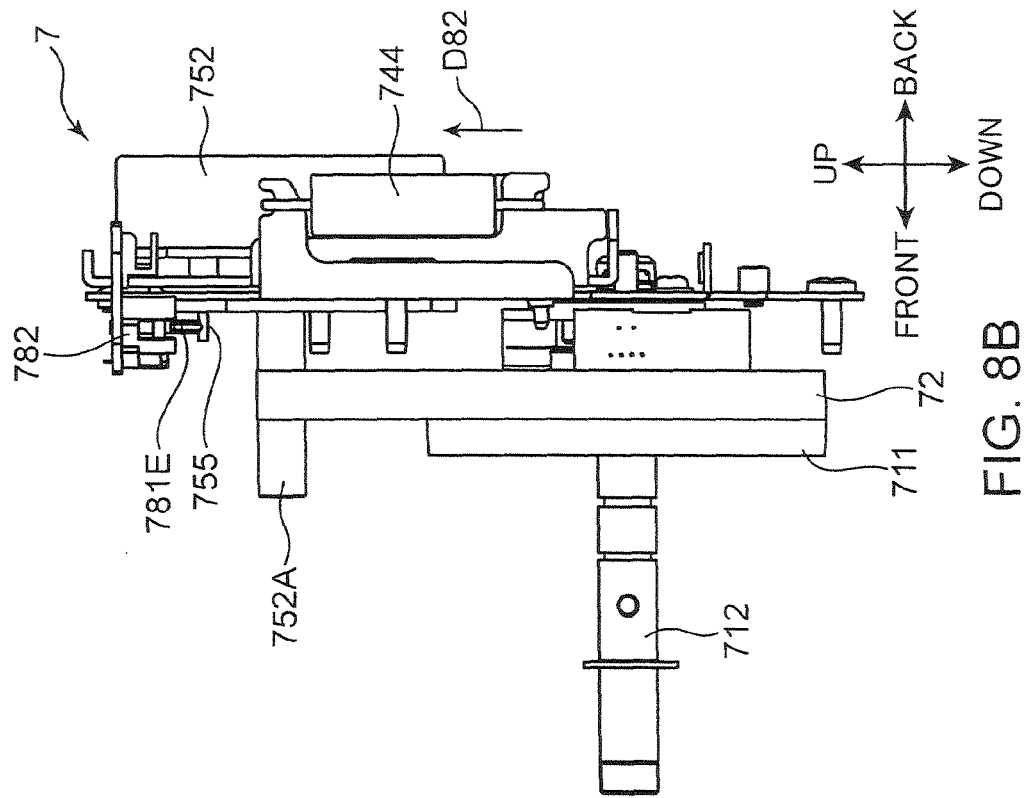
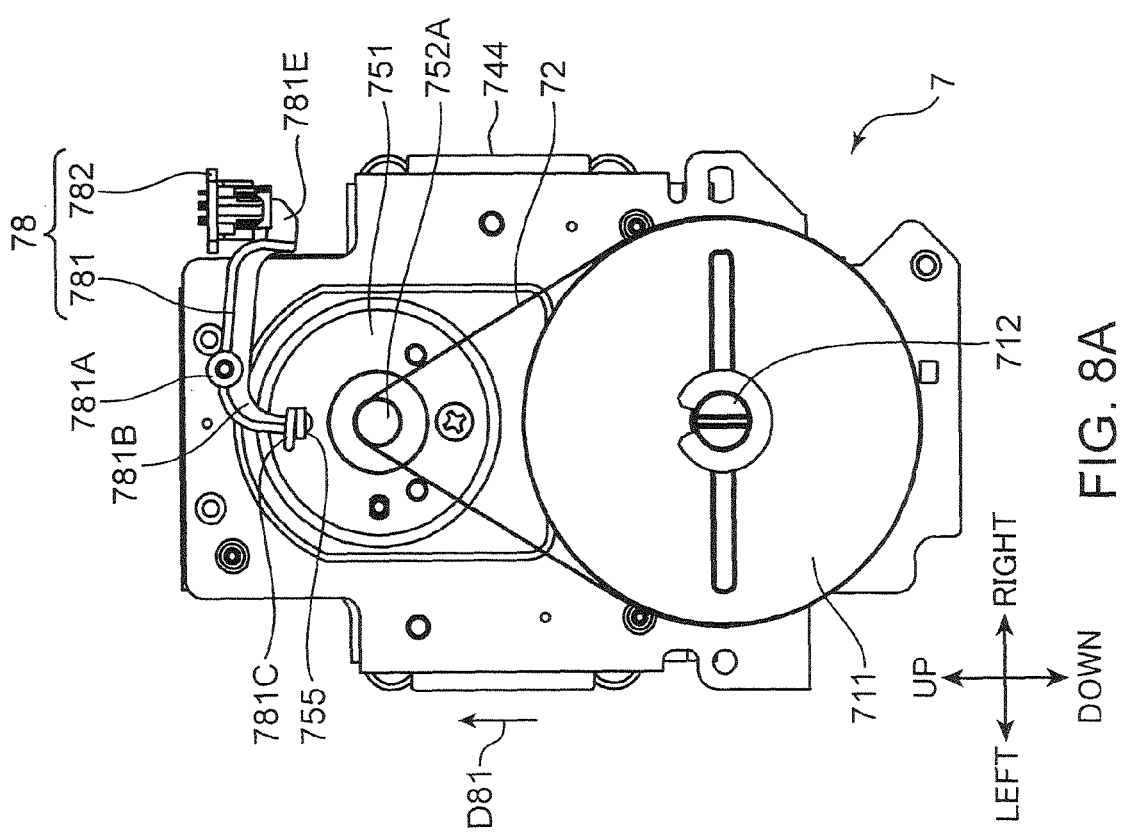
FIG. 8A
FIG. 8B

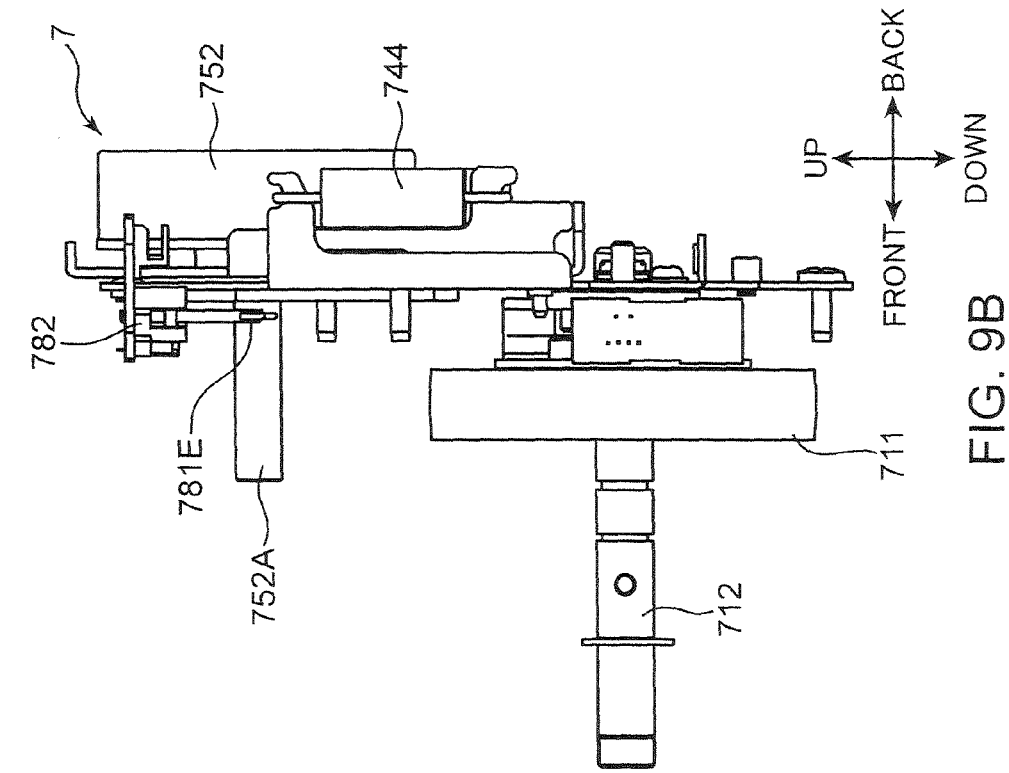
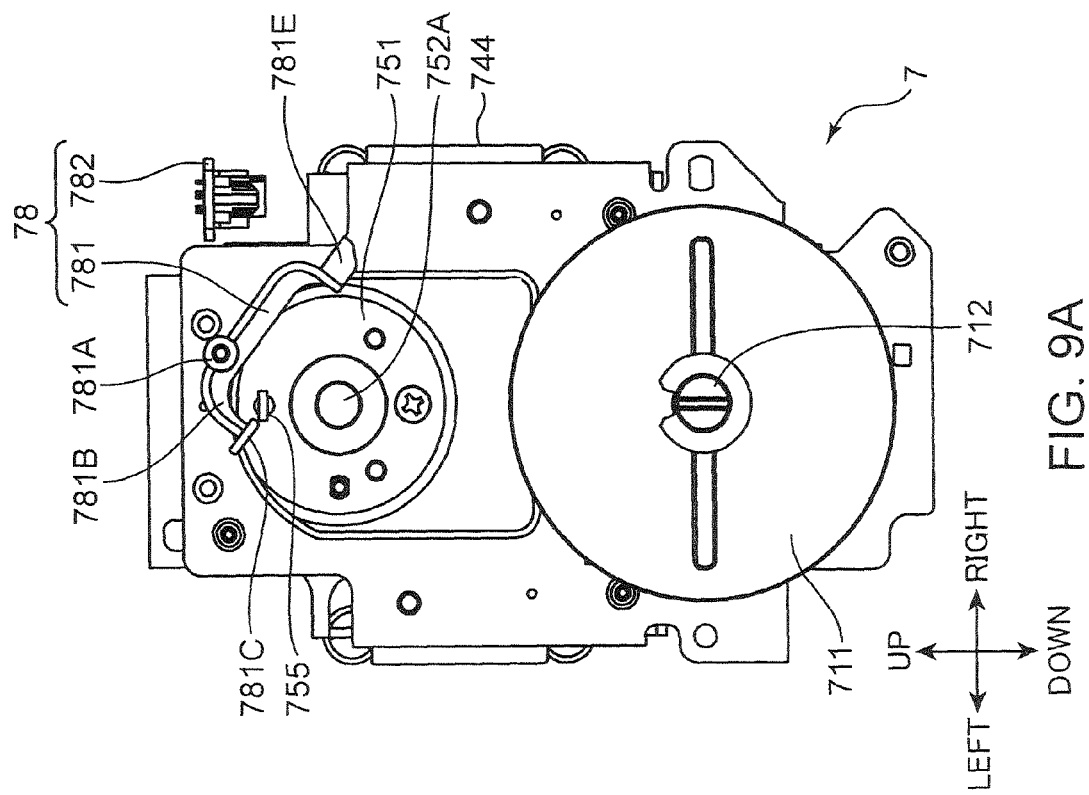
FIG. 9A
FIG. 9B

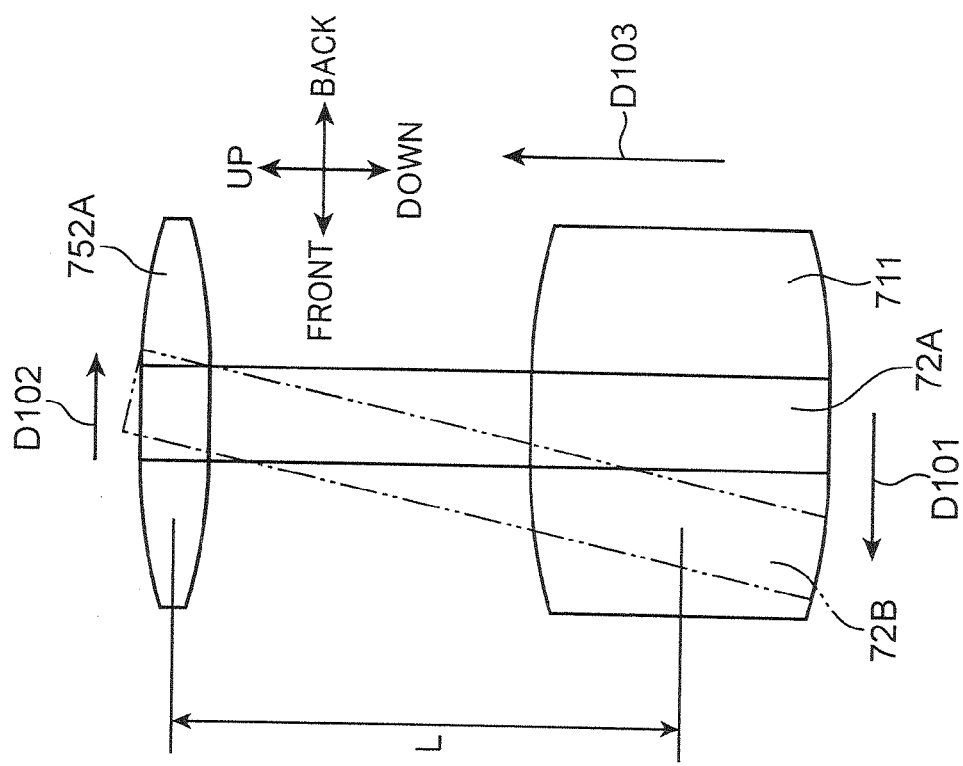
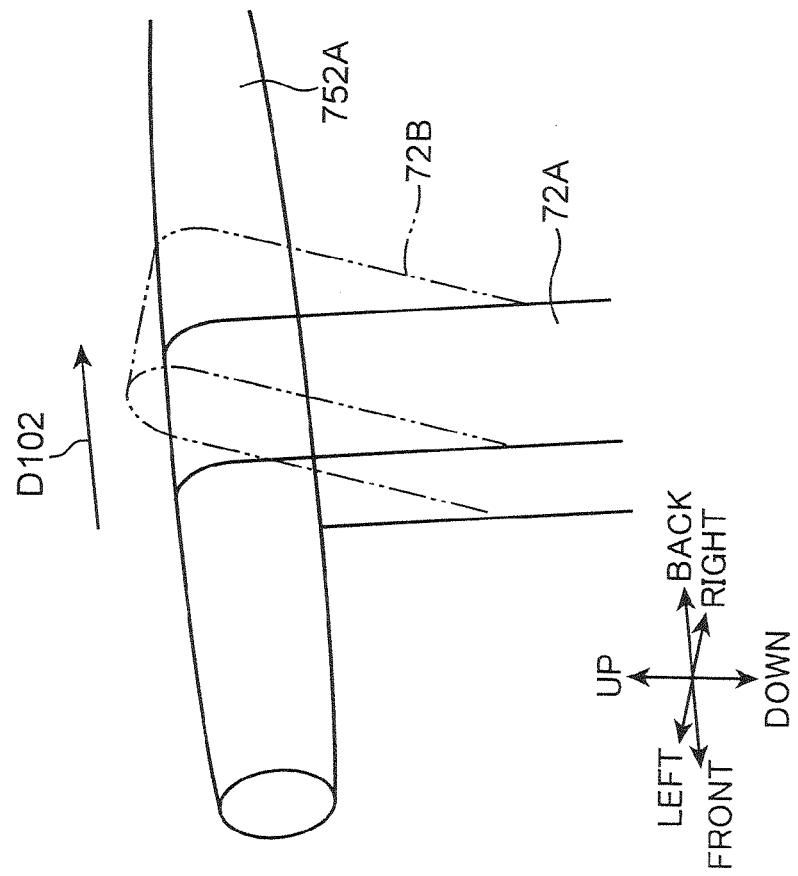

DRIVING DEVICE AND IMAGE FORMING APPARATUS PROVIDED WITH SAME

This application is based on Japanese Patent Application Serial No. 2012-191372 filed with the Japan Patent Office on Aug. 31, 2012, the contents of which are hereby incorporated by reference.

BACKGROUND

The present disclosure relates to a driving device for generating a rotational drive force for rotating a rotating body and an image forming apparatus provided with the same.

Conventionally, an electrophotographic image forming apparatus such as a copier, a printer or a facsimile machine forms a toner image on an image bearing member (e.g. photoconductive drum or transfer belt) by developing an electrostatic latent image formed on the image bearing member by supplying developer to the electrostatic latent image.

The image bearing member is involved in the formation of an electrostatic latent image, the development of the electrostatic latent image by toner and the transfer of a toner image. Thus, the image bearing member is required to have high rotation accuracy. Conventionally, a technique for reducing a driving speed by an endless metal belt mounted between pulleys having different diameters is known as a speed reducer arranged at an intermediate position of a transmission path for a rotational drive force from a drive motor to the image bearing member. Since there is no mesh between gears in such a technique, vibration associated with speed reduction is unlikely to be transmitted to the image bearing member.

Further, there is known a technique provided with an acoustic emission sensor for detecting an elastic wave, a transmitter for wirelessly transmitting a detection signal of the acoustic emission sensor by electromagnetic induction, and a discriminator for discriminating an abnormality. If an abnormality such as a crack occurs to a metal belt mounted between pulleys, an elastic wave of the metal belt detected by the sensor changes. The change of the elastic wave is analyzed by the discriminator and the abnormality is detected.

If the metal belt as described above moves in an axial direction on the pulley on which the metal belt is stretched or rotates in a state inclined with respect to the axial direction, it may cause a minute change in a speed reduction ratio. It is difficult to detect a minute behavior of the metal belt as described above with an abnormality detection technique based on a change of an elastic wave as described above.

The present disclosure was developed to solve the above problem and aims to detect a stretched state of a metal belt by a simple configuration.

SUMMARY

A driving device according to one aspect of the present disclosure includes a motor, a pulley, a metal belt, a first unit, a second unit, a biasing member and a detector. The motor includes a drive shaft and generates a rotational drive force. The pulley is in the form of a disk having a circumferential surface and includes, in a central part thereof, an output shaft extending in parallel to the drive shaft. Further, the pulley is rotatably supported with the output shaft as a rotary shaft and the circumferential surface is arranged at a distance from the drive shaft in a radial direction of the rotation. The metal belt is mounted between the drive shaft and the circumferential surface of the pulley and transmits the rotation of the drive shaft to the pulley by being driven and rotated. The first unit rotatably supports the pulley. The second unit supports the motor and is slidable in a direction connecting the drive shaft and the output shaft in a cross-section intersecting with an axial direction of the drive shaft. The biasing member biases the second unit in a direction to move the drive shaft away from the output shaft in a state where the metal belt is mounted between the drive shaft and the circumferential surface of the pulley. The detector detects a change in an interaxial distance between the drive shaft and the output shaft.

Further, an image forming apparatus according to another aspect of the present disclosure includes a driving device and an image bearing member. The image bearing member is driven and rotated by the driving device and bears a toner image on a surface.

These and other objects, features and advantages of the present disclosure will become more apparent upon reading the following detailed description along with the accompanying drawings.

BRIEF DESCRIPTION OF THE DRAWINGS

FIGS. 7A and 7B are a front view and a side view showing the state where the metal belt is normally stretched in the driving device according to the embodiment of the present disclosure, FIGS. 8A and 8B are a front view and a side view showing a state where the metal belt is obliquely stretched in the driving device according to the embodiment of the present disclosure, FIGS. 9A and 9B are a front view and a side view showing the state where the metal belt is fractured in the driving device according to the embodiment of the present disclosure, and FIGS. 10A and 10B are an enlarged perspective view and a diagrammatic side view showing the state where the metal belt is obliquely stretched in the driving device according to the embodiment of the present disclosure.

DETAILED DESCRIPTION

Figure 1:
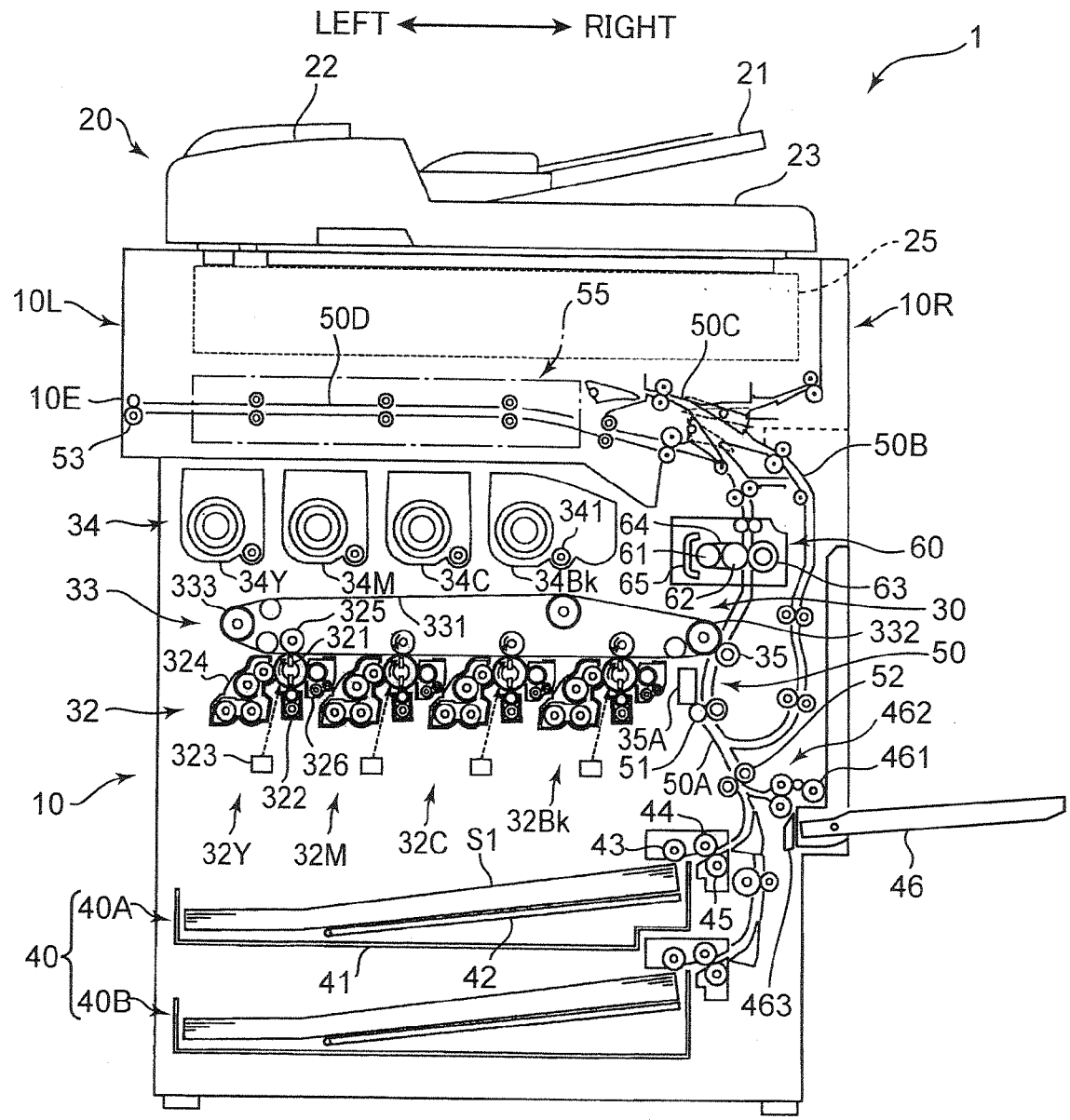
FIG. 1 is a sectional view showing the internal structure of an image forming apparatus according to an embodiment of the present disclosure.

Hereinafter, an embodiment of the present disclosure is described in detail based on the drawings. FIG. 1 is a sectional view showing the internal structure of an image forming apparatus 1 according to one embodiment of the present disclosure. Although a complex machine provided with a printer function and a copier function is illustrated as the image forming apparatus 1 here, the image forming apparatus may be a printer, a copier or a facsimile machine.

The image forming apparatus 1 is provided with an apparatus main body 10 having a substantially rectangular parallelepipedic housing structure and an automatic document feeder 20 arranged atop the apparatus main body 10. A reading unit 25 for optically reading a document image to be copied, an image forming station 30 for forming a toner image on a sheet, a fixing unit 60 for fixing the toner image to the sheet, a sheet feeding unit 40 for storing sheets to be conveyed to the image forming station 30, a conveyance path 50 for conveying the sheet from the sheet feeding unit 40 or a sheet feed tray 46 to a sheet discharge opening 10E by way of the image forming station 30 and the fixing unit 60, and a conveying unit 55 including a sheet conveyance path constituting a part of this conveyance path 50 inside are housed in the apparatus main body 10.

The automatic document feeder (ADF) 20 is rotatably mounted on the upper surface of the apparatus main body 10. The ADF 20 includes a document tray 21 on which document sheets are to be placed, a document conveying unit 22 for conveying a document sheet by way of an automatic document reading position, and a document discharge tray 23 to which a document sheet after being read is to be discharged.

The reading unit 25 optically reads an image of a document sheet automatically fed from the ADF 20 on the upper surface of the apparatus main body 10 or a manually placed document sheet.

The image forming station 30 is for performing a process of generating a full-color toner image and transferring this to a sheet, and includes image forming units 32, an intermediate transfer unit 33 arranged above and adjacent to the image forming units 32 and a toner supply unit 34 arranged above the intermediate transfer unit 33. The image forming units 32 are composed of four units 32Y, 32M, 32C and 32Bk arranged in a tandem manner for forming respective toner images of yellow (Y), magenta (M), cyan (C) and black (Bk).

Each of the image forming units 32Y, 32M, 32C and 32Bk includes a photoconductive drum 321 (image bearing member), and a charger 322, an exposing device 323, a developing device 324, a primary transfer roller 325 and a cleaning device 326 arranged around this photoconductive drum 321.

The photoconductive drum 321 rotates about its shaft and an electrostatic latent image and a toner image are to be formed on the circumferential surface thereof. The charger 322 uniformly charges the circumferential surface of the photoconductive drum 321. The exposure device 323 includes optical devices such as a laser light source, a mirror and a lens and forms an electrostatic latent image by irradiating the circumferential surface of the photoconductive drum 321 with light based on image data of a document image.

The developing device 324 supplies toner to the circumferential surface of the photoconductive drum 321 to develop an electrostatic latent image formed on the photoconductive drum 321.

The primary transfer roller 325 sandwiches an intermediate transfer belt 331 provided in the intermediate transfer unit 33 together with the photoconductive drum 321, thereby forming a nip portion, and primarily transfers a toner image on the photoconductive drum 321 onto the intermediate transfer belt 331. The cleaning device 326 includes a cleaning roller and the like and cleans the circumferential surface of the photoconductive drum 321 after the transfer of a toner image.

The intermediate transfer unit 33 includes the intermediate transfer belt 331, a drive roller 332 and a driven roller 333. The intermediate transfer belt 331 is an endless belt mounted between the driving roller 332 and the driven roller 333 and toner images from a plurality of photoconductive drums 321 are transferred in a superimposed manner at the same position on the outer circumferential surface of the intermediate transfer belt 331.

A secondary transfer roller 35 is arranged to face the circumferential surface of the driving roller 332. A nip portion between the driving roller 332 and the secondary transfer roller 35 serves as a secondary transfer section where a full-color toner image superimposed on the intermediate transfer belt 331 is transferred to a sheet. A secondary transfer bias potential having a polarity opposite to that of the toner image is applied to either one of the driving roller 332 and the secondary transfer roller 35 and the other roller is grounded. Further, a density sensor 35A is arranged at a position upstream of the driving roller 332 in a rotating direction of the intermediate transfer belt 331 to face the circumferential surface of the intermediate transfer belt 331.

The toner supply unit 34 supplies toner of each color to the developing device 324 via an unillustrated supply path. The toner supply unit 34 includes a toner container 34Y for yellow, a toner container 34M for magenta, a toner container 34C for cyan and a toner container 34Bk for black.

The sheet feeding unit 40 includes two sheet cassettes 40A, 40B arranged in two levels for storing sheets to which an image forming process is to be applied. These sheet cassettes 40A, 40B can be pulled forward from the front side of the apparatus main body 10.

The fixing unit 60 is an induction heating type fixing device for applying a fixing process of fixing a toner image to a sheet and includes a heating roller 61, a fixing roller 62, a pressure roller 63, a fixing belt 64 and an induction heating unit 65.

Figure 2:
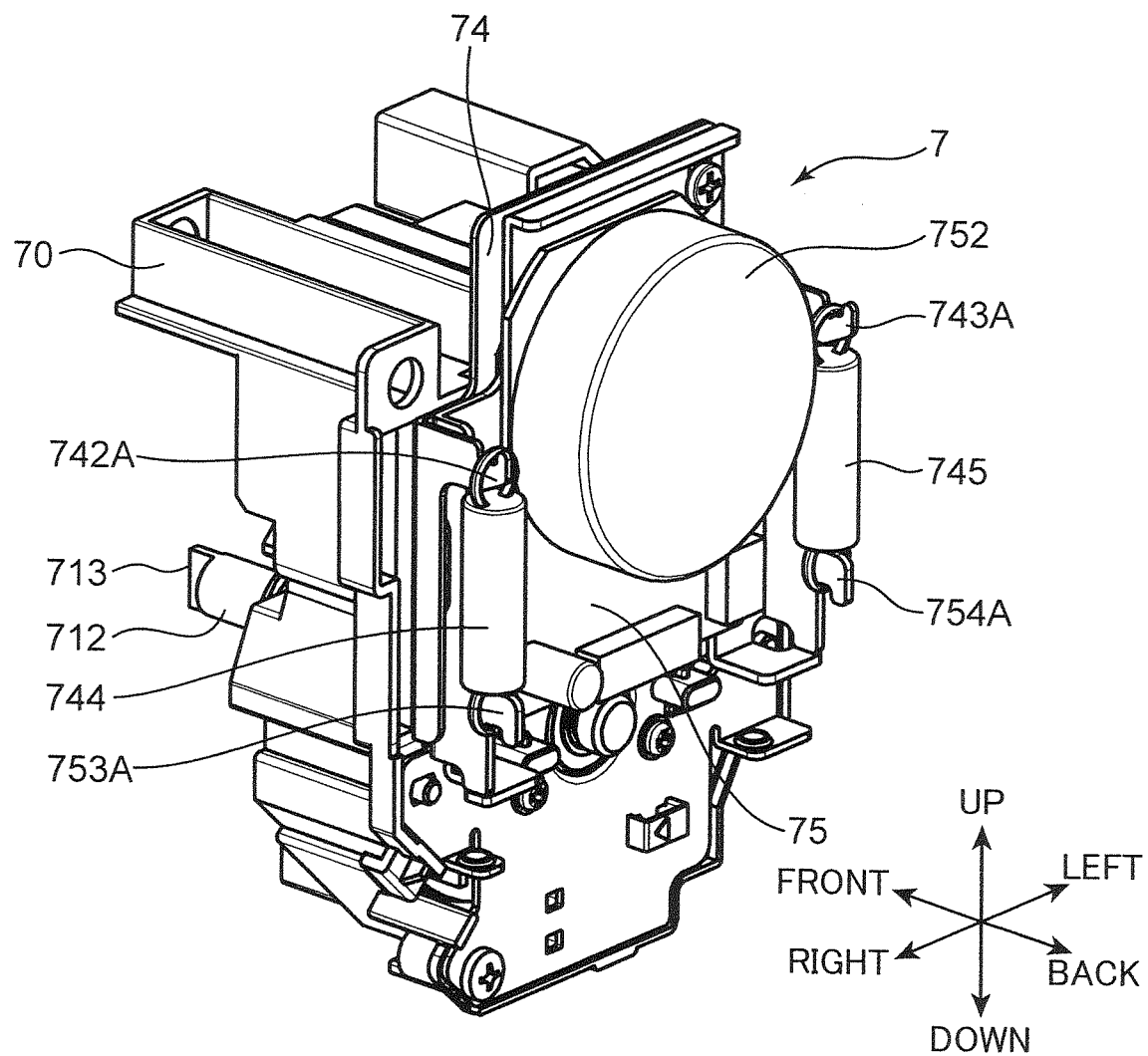
FIG. 2 is a perspective view of a driving device according to the embodiment of the present disclosure.
Figure 3:
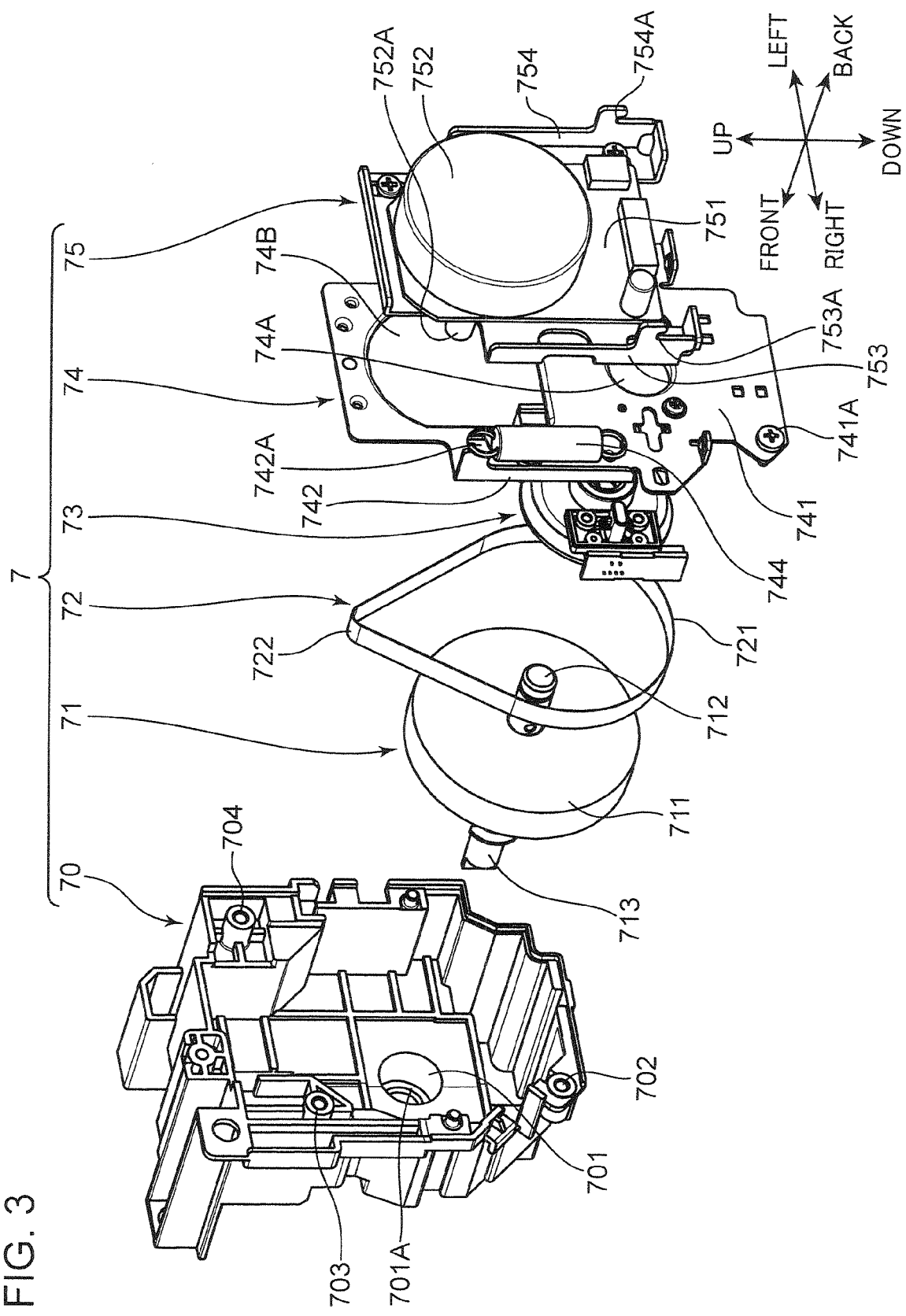
FIG. 3 is an exploded perspective view of the driving device according to the embodiment of the present disclosure.

Next, a driving unit 7 (driving device) according to this embodiment is described. FIG. 2 is a perspective view of the driving unit 7, and FIG. 3 is an exploded perspective view of the driving unit 7 of FIG. 2. In this embodiment, the driving unit 7 functions as a driver for driving and rotating the photoconductive drum 321.

The driving unit 7 includes a motor 752 and an output shaft 712. With the rotation of the motor 752, the output shaft 712 is driven and rotated. A drive transmitting portion 713 is arranged on a tip part of the output shaft 712. The drive transmitting portion 713 is coupled to the unillustrated shaft of the photoconductive drum 321. As a result, a rotational drive force of the motor 752 is transmitted to the photoconductive drum 321 to drive and rotate the photoconductive drum 321.

More specifically, the driving unit 7 includes a housing 70, a driven pulley 71 (pulley), a belt 72, a speed detector 73, a fixed unit 74 (first unit) and a motor unit 75 (second unit).

The housing 70 is a casing of the driving unit 70 and has a substantially box shape with an open rear part. The housing 70 includes a shaft hole 701, a first fastening portion 702, a second fastening portion 703 and a third fastening portion 704.

The shaft hole 701 is a hole formed on the front surface of the housing 70. A first bearing portion 701A is arranged in the shaft hole 701. The first bearing portion 701A is a bearing for rotatably supporting the output shaft 712 to be described later. Note that no bearing may be arranged in the shaft hole 701 in another embodiment. In this case, a bearing may be arranged on the apparatus main body 10 to which the driving unit 7 is to be attached. Specifically, the output shaft 712 is rotatably supported on the bearing of the apparatus main body 10 after being passed through the shaft hole 701. The first, second and third fastening portions 702, 703 and 704 are fastening portions for fixing the fixed unit 74 to be described later to the housing 70 and a fixing screw is fastened to each of them.

The driven pulley 71 is a disk-shaped pulley. The driven pulley 71 includes a driven pulley main body 711 and the output shaft 712. The driven pulley main body 711 is a main body part of the driven pulley 71. The circumferential surface of the driven pulley main body 711 has a crown shape in which an outer diameter slightly changes in an axial direction (see FIG. 10B). The output shaft 712 is fixed to penetrate through a central part of the driven pulley main body 711. The aforementioned drive transmitting portion 713 is arranged on a front tip part of the output shaft 712. When the output shaft 712 is inserted into the first bearing portion 701A of the housing 70, the drive transmitting portion 713 projects forward from the housing 70.

The belt 72 is mounted between the circumferential surface of the driven pulley main body 711 and a drive pulley 752A to be described later. The belt 72 has a function of transmitting a rotational drive force from the drive pulley 752A to the driven pulley main body 711. In this embodiment, the belt 72 is an endless metal belt. High rigidity of the belt 721 is maintained by forming the belt 72 by the metal belt. Further, the belt 72 is stretched and contracted little in a rotating direction thereof and the number of revolutions of the drive transmitting portion 713 is stably maintained. The belt 72 being rotated is sorted into two regions: a lower rotating portion 721 and an upper rotating portion 722. The lower rotating portion 721 is mounted on the circumferential surface of the driven pulley main body 711 and the upper rotating portion 722 is mounted on an outer peripheral part of the drive pulley 752A to be described later.

The speed detector 73 detects the number of revolutions of the output shaft 712. The number of revolutions of the output shaft 712 detected by the speed detector 73 is transmitted to an unillustrated control unit. The control unit finely adjusts the number of revolutions of the motor 752 in accordance with a fluctuation in the number of revolutions of the output shaft 712. Further, the speed detector 73 also has a function as a rear bearing for the output shaft 712. Note that a bearing for rotatably supporting a rear end part of the output shaft 712 may be arranged in addition to the speed detector 73 in another embodiment.

The fixed unit 74 rotatably supports the driven pulley 71. Further, the fixed unit 74 is fixed to the housing 70. The fixed unit 74 includes a fixed plate 741, a first screw fixing portion 741A, a first side wall portion 742, a second side wall portion 743, a first spring 744 (biasing member) and a second spring 745 (biasing member).

The fixed plate 741 is a main body part of the fixed unit 74 and a substantially rectangular metal plate member extending in vertical and lateral directions. The fixed plate 741 includes a fixing hole 74A and an insertion hole 74B. The fixing hole 74A is a hole formed at a position slightly below a vertical central part of the fixed plate 741. The driven pulley 71 is rotatably supported on the fixed unit 74 by mounting the speed detector 73 provided with the above bearing function in the fixing hole 74A of the fixed unit 74. In other words, the output shaft 712 of the driven pulley 71 is rotatably supported between the first bearing portion 701A of the housing 70 and the bearing portion of the speed detector 73 mounted in the fixed unit 74. The insertion hole 74B is a substantially rectangular hole formed above the fixing hole 74A in the fixed plate 741. The drive pulley 752A to be described later is movably inserted into the insertion hole 74B.

The first screw fixing portion 741A is arranged on a lower right end part of the fixed plate 741. The first screw fixing portion 741A is fixed to the first fastening portion 702 of the housing 70. Note that, although not shown in FIG. 3, other two fixing portions arranged on the fixed plate 741 are respectively fixed to the second and third fastening portions 703, 704 of the housing 70. As a result, the fixed unit 74 is integrally fixed to the housing 70. The first and second side wall portions 742, 743 are wall portions respectively extending backward from vertical central parts of the left and right edges of the fixed plate 741. Note that only the first side wall portion 742 is shown in FIG. 3. A first cut portion 742A (first fixing portion) is arranged on an upper end part of the first side wall portion 742. The first cut portion 742A is a part formed by cutting a part of the upper end part of the first side wall portion 742 to extend downward. Note that, although not shown in FIG. 3, the second side wall portion 743 similarly includes a second cut portion 743A (first fixing portion). The first and second springs 744, 745 are respectively spring members, upper end parts (one ends) of which are hooked on the first and second cut portions 742A, 743A. Note that lower end parts (other ends) of the first and second springs 744, 745 are hooked on the motor unit 75.

The motor unit 75 is arranged to face the fixed unit 74 behind the fixed unit 74. The motor unit 75 includes a motor supporting member 751, the motor 752, a third side wall portion 753 and a fourth side wall portion 754. The motor supporting member 751 is a main body part of the motor unit 75 and a substantially rectangular metal plate member extending in the vertical and lateral directions. The motor 752 is a motor arranged on an upper part of the motor supporting member 751. The motor 752 includes the drive pulley 752A (drive shaft). The drive pulley 752A is a drive shaft projecting forward from the motor 752. The drive pulley 752A has a crown shape in which an outer diameter slightly changes in an axial direction (see FIGS. 10A, 10B). Note that the drive pulley 752A is inserted into the insertion hole 74B of the fixed plate 741 of the fixed unit 74 as described above. The aforementioned belt 72 (upper rotating portion 722) is mounted on the outer peripheral part of the drive pulley 752A.

The third and fourth side wall portions 753, 754 are wall portions extending backward from the left and right edges of the motor supporting member 751. When the motor unit 75 is arranged to face the fixed unit 74, the third and fourth side wall portions 753, 754 are arranged at inner sides of the first and second side wall portions 742, 743 in the lateral direction. The third and fourth side wall portions 753, 754 respectively include a third cut portion 753A (second fixing portion) and a fourth cut portion 754A (second fixing portion). The third and fourth cut portions 753A, 754A are cut portions formed by cutting lower end parts of the third and fourth side wall portions 753, 754 to extend upward. The lower end parts of the aforementioned first and second springs 744, 745 are hooked on the third and fourth cut portions 753A, 754A. As a result, the motor unit 75 is slidable in the vertical direction with elastic forces of the first and second springs 744, 745 at the inner sides of the first and second side wall portions 742, 743 of the fixed unit 74.

That is, the driving unit 7 includes the motor 752, the driven pulley 71, the belt 72, the fixed unit 74, the motor unit 75 and the first and second springs 744, 745. The motor 752 includes the drive pulley 752A to be rotated and generates a rotational drive force of the drive pulley 752A. Further, the driven pulley 71 is in the form of a disk having the circumferential surface, and the output shaft 712 extending in parallel to the drive pulley 752A is provided in the central part of the driven pulley 71. The circumferential surface of the driven pulley 71 is arranged at a distance from the drive pulley 752A in a radial direction of the rotation. Further, the belt 72 is mounted between the drive pulley 752A and the circumferential surface of the driven pulley 71 and transmits the rotation of the drive pulley 752A to the driven pulley 71 by being driven and rotated. Further, the fixed unit 74 rotatably supports the driven pulley 71. Furthermore, the motor unit 75 supports the motor 752 and is slidable in a direction connecting the drive pulley 752A and the output shaft 712 in a cross-section including a radial direction of the drive pulley 752A (cross-section intersecting with the axial direction of the drive pulley 752A). Note that the first and second springs 744, 745 bias the motor unit 75 in a direction to move the drive pulley 752A away from the output shaft 712 in a state where the belt 72 is mounted between the drive pulley 752A and the circumferential surface of the driven pulley main body 711.

When the drive pulley 752A of the motor 752 is driven and rotated in this way, the rotational drive force of the drive pulley 752A is transmitted to the driven pulley main body 711 by the belt 72. By rotating the output shaft 712 of the driven pulley 71, the photoconductive drum 321 coupled to the drive transmitting portion 713 is rotated. Note that the outer diameter of the driven pulley main body 711 is set to be larger than that of the drive pulley 752A in this embodiment. Thus, a reduction in the speed of the rotational drive is preferably realized in transmitting the rotational drive force of the drive pulley 752A to the driven pulley main body 711 via the belt 72. That is, the belt 72 has a function as a speed reduction mechanism.

Figure 4:
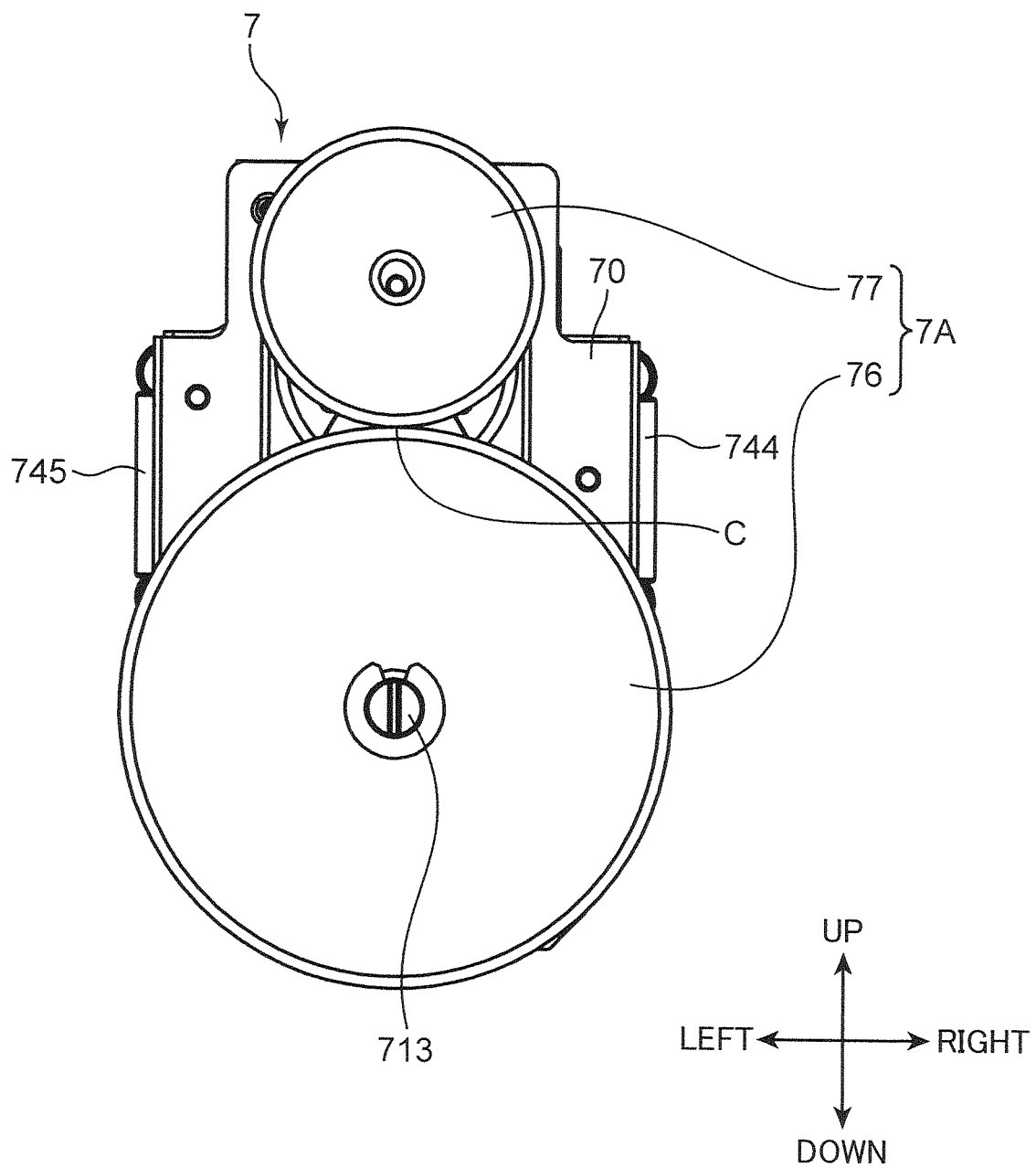
FIG. 4 is a front view of the driving device according to the embodiment of the present disclosure.
Figure 5:
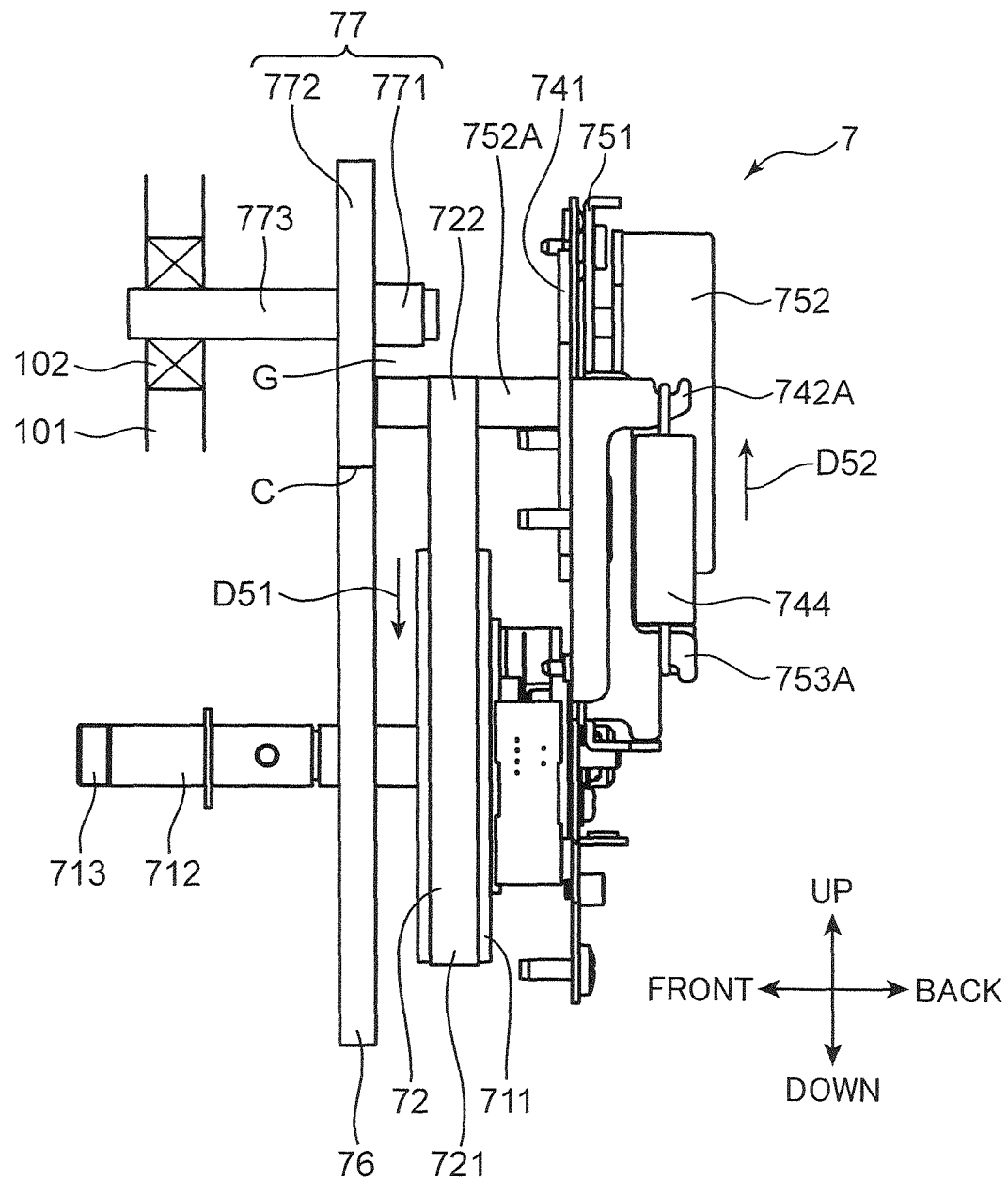
FIG. 5 is a side view showing a state where a metal belt is normally stretched in the driving device according to the embodiment of the present disclosure.
Figure 6:
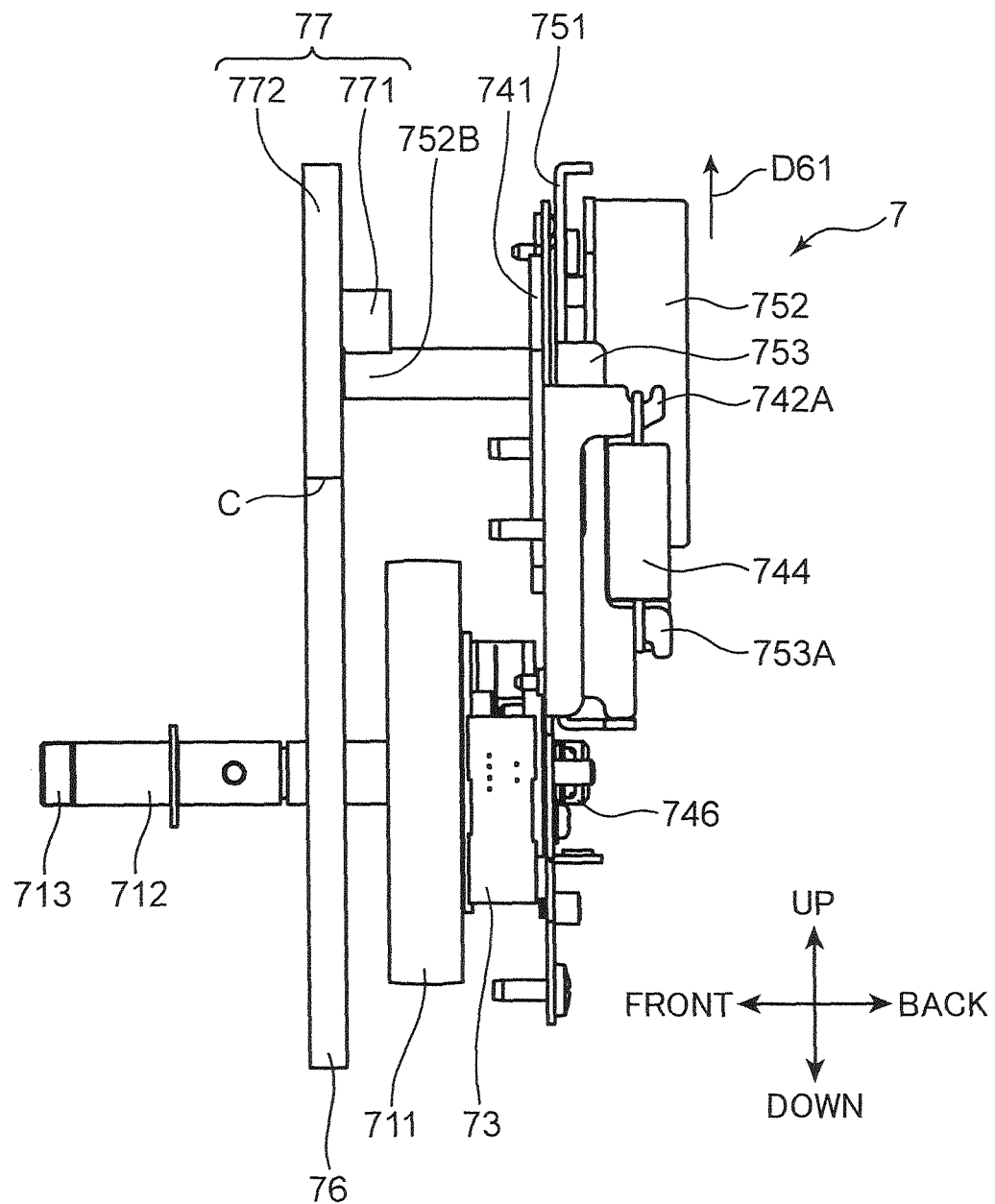
FIG. 6 is a side view showing a state where the metal belt is fractured in the driving device according to the embodiment of the present disclosure.

Next, an auxiliary drive mechanism 7A (auxiliary transmission unit) according to this embodiment is described with reference to FIGS. 4 to 6. FIG. 4 is a front view of the driving unit 7 mounted with the auxiliary drive mechanism 7A. FIG. 5 is a side view of FIG. 4 when viewed from the right. FIG. 6 is a side view showing a state where the belt 72 is fractured in FIG. 5. The auxiliary drive mechanism 7A is coupled to the driving unit 7. The auxiliary drive mechanism 7A has a function of transmitting the rotational drive force of the drive pulley 752A to the output shaft 712 in association with the fracture of the belt 72.

With reference to FIGS. 4 and 5, the auxiliary drive mechanism 7A includes a first auxiliary drive gear 76 (first auxiliary transmitting portion) and a second auxiliary drive gear 77 (second auxiliary transmitting portion).

The first auxiliary drive gear 76 has a disk shape and unillustrated gear teeth are provided on the circumferential surface thereof. The first auxiliary drive gear 76 is fixed to the output shaft 712 while being spaced apart from the driven pulley main body 711 in the axial direction of the output shaft 712 (FIG. 5).

The second auxiliary drive gear 77 is coupled to the first auxiliary drive gear 76. The second auxiliary drive gear 77 is rotatably supported on a shaft 773. As shown in FIG. 5, the shaft 773 is arranged on a rear inner wall portion 101 of the apparatus main body 10 of the image forming apparatus 1 via an inner wall bearing portion 102. By inserting the shaft 773 into an unillustrated insertion hole formed in the second auxiliary drive gear 77, the second auxiliary drive gear 77 is rotatably supported on the shaft 773.

The second auxiliary drive gear 77 includes a coupled gear 771 (coupling portion) and a transmission gear 772 (transmitting portion). The transmission gear 772 transmits the rotational drive force to the first auxiliary drive gear 76. The transmission gear 772 has a disk shape and unillustrated gear teeth are provided on the circumferential surface thereof. The coupled gear 771 is arranged on the same axis as the transmission gear 772 at a side of the drive pulley 752A opposite to the output shaft 712 while being radially spaced apart from the drive pulley 752A.

With reference to FIG. 5, the belt 72 is mounted between the drive pulley 752A and the driven pulley main body 711, and the rotational drive force of the drive pulley 752A is transmitted to the output shaft 712 via the belt 72. At this time, the first auxiliary drive gear 76 is driven and rotated integrally with the output shaft 712. Further, since the transmission gear 772 is meshed with the first auxiliary drive gear 76 in a drive transmission nip portion C, the second auxiliary drive gear 77 is rotated, following the rotation of the first auxiliary drive gear 76. At this time, the belt 72 biases the drive pulley 752A downward as described above (arrow D51 of FIG. 5). Further, since the first spring 744 (second spring 745) biases the motor supporting member 751 upward (arrow D52 of FIG. 5), the drive pulley 752A is biased upward by the first spring 744 (second spring 745). As a result, a gap G is formed between the drive pulley 752A and the coupled gear 771 of the second auxiliary drive gear 77.

On the other hand, with reference to FIG. 6, if the belt 72 is fractured due to a sudden factor while the driving unit 7 is being driven or with long-term use of the belt 72, a transmission path for the rotational drive force of the output shaft 712 via the belt 72 is lost. Simultaneously, a force applied from the belt 72 to bias the drive pulley 752A downward is lost. This causes the motor supporting member 751 to be moved upward relative to the fixed plate 741 by a biasing force of the first spring 744 (second spring 745) (arrow D61 of FIG. 6) (sliding movement). As a result, a coupling portion 752B which is a tip part of the drive pulley 752A is brought into contact with the coupled gear 771 of the second auxiliary drive gear 77. Note that gear teeth are formed at the same pitches on outer peripheral parts of the coupling portion 752B and the coupled gear 771 in advance. Thus, the rotational drive force of the drive pulley 752A is transmitted to the coupled gear 771 from the coupling portion 752B. As a result, the rotational drive force of the drive pulley 752A is transmitted from the second auxiliary drive gear 77 to the output shaft 712 via the first auxiliary drive gear 76. Thus, even if the belt 72 is fractured, the rotational drive force can be transmitted to the output shaft 712. Note that since the first and second auxiliary drive gears 76, 77 are meshed by predetermined gear teeth in the drive transmission nip portion C as described above, mesh vibration of the gear teeth may occur as compared with the transmission of the rotational drive force by the belt 72. However, as described above, the stop of the rotational drive of the photoconductive drum 321 in association with the fracture of the belt 72 is suppressed and the continuous use of the image forming apparatus 1 is realized.

Next, a detector 78 according to this embodiment is described in detail with reference to FIGS. 7 to 10. FIGS. 7A and 7B are a front view and a side view of the driving unit 7 provided with the detector 78. FIGS. 8A and 8B are a front view and a side view of the driving unit 7 in a state where the belt 72 is moved in the axial direction from a state of FIGS. 7A and 7B. FIGS. 9A and 9B are a front view and a side view of the driving unit 7 when the belt 72 is fractured. FIGS. 10A and 10B are an enlarged perspective view and a diagrammatic side view showing a state where the belt 72 is obliquely stretched on the drive pulley 752A.

The driving unit 7 includes the detector 78. The detector 78 detects a change in an inter-axial distance between the drive pulley 752A and the output shaft 712. Particularly, in this embodiment, the drive pulley 752A is moved in association with a sliding movement of the motor unit 75 relative to the fixed unit 74, whereby a change in the inter-axial distance is detected by the detector 78.

The detector 78 includes an arm unit 781 (actuator) and a sensor unit 782.

The arm unit 781 is rotatably supported on the fixed unit 74. The arm unit 781 is pressed by the motor unit 75 in association with a sliding movement of the motor unit 75. The arm unit 781 includes a supporting point portion 781A, a left arm portion 781B (second arm portion) and a right arm portion 781D (first arm portion). The supporting point portion 781A serves as a supporting point of the rotation of the arm portion 781. The supporting point portion 781A is an unillustrated hole formed in the arm unit 781 and an unillustrated shaft portion projecting forward from the fixed plate 741 is inserted thereinto. The left arm portion 781B is an arm portion which is bent downward after extending to the left from the supporting point portion 781A. The left arm portion 781B includes a contacted portion 781C on a tip part. The contacted portion 781C can come into contact with a projection 755 of the motor supporting member 751 to be described later. The right arm portion 781D is an arm portion extending to the right from the supporting point portion 781A. Specifically, the left arm portion 781B extends in a direction different from the right arm portion 781D. A detection piece 781E projecting further rightward is arranged on a tip part of the right arm portion 781D. The detection piece 781E is detected by the sensor unit 782. The detection piece 781E is substantially vertically moved with the rotation of the arm unit 781.

The sensor unit 782 is a sensor fixed to the rear inner wall portion 101 (FIG. 5) of the image forming apparatus 1. The sensor unit 782 detects a movement of the detection piece 781E associated with the rotation of the arm unit 781. In this embodiment, a plurality of optical sensors is arranged adjacent to each other in the vertical direction in the sensor unit 782. Thus, a tiny vertical movement of the detection piece 781E can be accurately detected by the plurality of optical sensors.

Further, on the motor supporting member 751 of the motor unit 75, the projection 755 (contacting portion) is arranged above the drive pulley 752A. The projection 755 is a projecting piece projecting forward from the motor supporting member 751. The projection 755 comes into contact with the contacted portion 781C of the arm unit 781. Further, the projection 755 presses the contacted portion 781C upward in association with a sliding movement of the motor unit 75.

With reference to FIGS. 7A and 7B, the projection 755 of the motor unit 75 is slightly in contact with the contacted portion 781C of the arm unit 781 in the state where the belt 72 is mounted between the drive pulley 752A and the driven pulley main body 711. At this time, the detection piece 781E of the arm unit 781 is arranged at an uppermost position and detected by the plurality of optical sensors in the sensor unit 782. Particularly, in this embodiment, the belt 72 is in the state as shown in FIGS. 7A and 7B if it is stably stretched in the vertical direction when the motor 752 is driven and rotated. In other words, the projection 755 is arranged at a first position where the projection 755 is slightly in contact with the contacted portion 781C of the left arm portion 781B in a first state where the belt 72 is so mounted between the drive pulley 752A and the circumferential surface of the driven pulley main body 711 to be stretched in a first direction (vertical direction) perpendicular to or substantially perpendicular to an extending direction of the drive pulley 752A.

On the other hand, as shown in FIG. 8B, the projection 755 is slightly moved upward if the belt 72 mounted between the drive pulley 752A and the driven pulley main body 711 is moved in the axial direction. With reference to FIGS. 10A and 10B, in this embodiment, the drive pulley 752A and the driven pulley main body 711 have the crown shape in which the outer diameter slightly changes in the axial direction as described above. In other words, the outer diameter is set to be smaller on axial outer sides than in an axial central part in both of the drive pulley 752A and the driven pulley main body 711.

When being rotated as the driving unit 7 is driven, the belt 72 may move in the axial direction on the driven pulley main body 711 (arrow D101 of FIG. 10B). In this case, the belt 72 moves from a position denoted by 72A to a position denoted by 72B in FIG. 10A and FIG. 10B. At this time, the belt 72 is slightly loosened since the drive pulley 752A and the driven pulley main body 711 have the crown shape. As a result, the drive pulley 752A is movable relative to the driven pulley main body 711 by the amount of loosening. Thus, the motor unit 75 is slid upward relative to the fixed unit 74 by the biasing forces of the first and second springs 744, 745. As a result, the drive pulley 752A is slightly moved upward relative to the driven pulley main body 711. Such a variation in the inter-axial distance between the drive pulley 752A and the driven pulley main body 711 (output shaft 712) associated with the behavior of the belt 72 is detected by the sensor unit 782. Specifically, if the motor supporting member 751 is slid upward relative to the fixed plate 741 as shown in FIG. 8 (arrow D81 of FIG. 8A, arrow D82 of FIG. 8B), the projection 755 slightly presses the contacted portion 781C of the left arm portion 781B upward. As a result, the arm unit 781 is rotated about the supporting point portion 781A and the detection piece 781E is slightly moved downward. At this time, the detection piece 781E is moved downward from a position facing the optical sensors arranged above out of the plurality of optical sensors having detected the detection piece 781E. Thus, the unillustrated control unit of the image forming apparatus 1 detects a movement of the motor supporting member 751 by an output fluctuation of the optical sensors transmitted from the sensor unit 782. In other words, a change in the posture of the belt 72 mounted between the drive pulley 752A and the output shaft 712 (state change) is detected. That is, the projection 755 presses the contacted portion 781C of the left arm portion 781B upward to a position located above the first position in a second state where the belt 72 is so mounted between the drive pulley 752A and the circumferential surface of the driven pulley main body 711 that the inclination of the belt 72 with respect to the drive pulley 752A is inclined with respect to the first direction. Such a behavior of the belt could similarly occur when the belt 72 moves in the axial direction on the drive pulley 752A (arrow D102 of FIGS. 10A, 10B).

Further, with reference to FIGS. 9A and 9B, if the belt 72 is fractured for a sudden reason or with long-term use as described above, the transmission path for the rotational drive force of the output shaft 712 via the belt 72 is lost. Simultaneously, the force applied from the belt 72 to bias the drive pulley 752A downward is lost. This causes the motor supporting member 751 to be moved upward relative to the fixed plate 741 by the biasing force of the first spring 744 (second spring 745). As a result, the projection 755 is arranged at a second position where the contacted portion 781C is pressed further upward from the state of FIGS. 8A and 8B and the arm unit 781 is largely rotated about the supporting point portion 781A. Then, the detection piece 781E is moved downward from a part facing all the optical sensors arranged in the sensor unit 782. That is, signals transmitted from all the optical sensors of the sensor unit 782 to the aforementioned control unit become LOW signals. As a result, the control unit can detect a movement of the detection piece 781E away from the sensor unit 782, i.e. the fracture of the belt 72. At this time, in this embodiment, even after the belt 72 is fractured, the transmission of the rotational drive force to the output shaft 712 is preferably continued by providing the auxiliary drive mechanism 7A as described above.

As just described, according to the above embodiment, when the belt 72 is so mounted between the drive pulley 752A and the circumferential surface of the driven pulley main body 711 as to extend in the first direction perpendicular to or substantially perpendicular to the extending direction of the drive pulley 752A (first state), the projection 755 is arranged at the first position. On the other hand, when the belt 72 is so mounted between the drive pulley 752A and the circumferential surface of the driven pulley main body 711 that the inclination of the belt 72 with respect to the drive pulley 752A is inclined with respect to the first direction (second state), the projection 755 is arranged at the second position. The projection 755 presses the left arm portion 781B more at the second position than at the first position. Thus, an oblique rotating state of the belt 72 is preferably detected by the detector 78.

Further, according to the above embodiment, the sensor unit 782 can detect a movement of the detection piece 781E in a plurality of stages. Thus, the state of the belt 72 mounted between the drive pulley 752A and the driven pulley main body 711 can be more finely detected. Particularly, the state of the belt 72 can be finely detected by the plurality of optical sensors arranged along a moving direction of the detection piece 781E.

Further, according to the above embodiment, the first and second springs 744, 745 are spring members extending in the direction connecting the drive pulley 752A and the output shaft 712 in the cross-section intersecting with the axial direction of the drive pulley 752A. The one ends of the first and second springs 744, 745 are fixed to the first and second cut portions 742A and 743A. The other ends of the first and second springs 744, 745 are fixed to the third and fourth cut portions 753A, 754A spaced apart from the first and second cut portions 742A, 743A of the motor unit 75 in a direction from the drive pulley 752A to the output shaft 712. Thus, the motor unit 75 is made slidable by the first and second springs 744, 745 arranged between the first and second cut portions 742A, 743A of the fixed unit 74 and the third and fourth cut portions 753A, 754A of the motor unit 75.

Further, according to the above embodiment, even if the belt 72 is fractured, the rotational drive force of the drive pulley 752A is transmitted to the output shaft 712 by the auxiliary drive mechanism 7A. Specifically, even if the belt 72 is fractured, the drive pulley 752A is coupled to the coupled gear 771 of the second auxiliary drive gear 77 by the biasing forces of the first and second springs 744, 745. The rotational drive force of the drive pulley 752A is transmitted to the first auxiliary drive gear 76 from the transmission gear 772 on the same axis as the coupled gear 771. As a result, the rotational drive force is transmitted to the output shaft 712.

Although the driving unit 7 according to the embodiment of the present disclosure and the image forming apparatus 1 provided with this are described above, the present disclosure is not limited to this. For example, the following modifications can be adopted.

Although the driving unit 7 is described to include the auxiliary drive mechanism 7A and the detector 78 in the above embodiment, the present disclosure is not limited to this. The driving unit 7 may include one of the auxiliary drive mechanism 7A and the detector 78. If the driving unit 7 includes only the detector 78, the behavior or fracture of the belt 72 is detected by the detector 78. Thus, the maintenance of the driving unit 7 can be performed early by displaying a detection result of the detector 78 on an unillustrated display unit of the image forming apparatus 1. On the other hand, if the driving unit 7 includes only the auxiliary drive mechanism 7A, the auxiliary drive mechanism 7A can take over the transmission of the rotational drive force of the output shaft 712 even if the belt 72 is fractured. Therefore, it is possible to reduce a time during which the operation of the image forming apparatus 1 is stopped in association with a rotation failure of the photoconductive drum 321.

Although the photoconductive drum 321 is described as a target to be driven and rotated by the driving unit 7 in the above embodiment, the present disclosure is not limited to this. The driving unit 7 may rotate another rotating body of the image forming apparatus such as the intermediate transfer belt 331. Particularly, the occurrence of an image quality defect on a toner image due to vibration is preferably suppressed by a smooth drive transmission characteristic of the metal belt in the belt 72 in a member for carrying the toner image such as the photoconductive drum 321 and the intermediate transfer belt 331.

Although the drive pulley 752A and the driven pulley main body 711 are described to have the crown shape as shown in FIGS. 10A and 10B in the above embodiment, the present disclosure is not limited to this. One of the drive pulley 752A and the driven pulley main body 711 may have a crown shape. Particularly, if the drive pulley 752A is made of metal and the driven pulley main body 711 is made of resin, the driven pulley main body 711 desirably has a crown shape. As compared with the drive pulley 752A made of metal, the crown shape can be inexpensively prepared by a shape change of a mold for molding the driven pulley main body 711. Further, if the driven pulley main body 711 having a larger diameter than the drive pulley 752A has the crown shape, the belt 72 is stably rotated. Note that both of the drive pulley 752A and the driven pulley main body 711 desirably have the crown shape as described above for more stable rotation of the metal belt.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What invention claimed is:

1. A driving device, comprising:
   a motor including a drive shaft and configured to generate a rotational drive force;
   a pulley in the form of a disk having a circumferential surface, including, in a central part thereof, an output shaft extending in parallel to the drive shaft and rotatably supported with the output shaft as a rotary shaft, the circumferential surface being arranged at a distance from the drive shaft in a radial direction of the rotation;
   a metal belt mounted between the drive shaft and the circumferential surface of the pulley and configured to transmit the rotation of the drive shaft to the pulley by being driven and rotated;
   a first unit configured to rotatably support the pulley;
   a second unit configured to support the motor and slidable in a direction connecting the drive shaft and the output shaft in a cross-section intersecting with an axial direction of the drive shaft;
   a biasing member configured to bias the second unit in a direction to move the drive shaft away from the output shaft in a state where the metal belt is mounted between the drive shaft and the circumferential surface of the pulley;
   a detector configured to detect a change in an inter-axial distance between the drive shaft and the output shaft; and
   an auxiliary transmission unit to be coupled to the drive shaft in association with a fracture of the metal belt and configured to transmit a rotational drive force of the drive shaft to the output shaft.

2. The driving device according to claim 1, wherein the detector includes:
   an actuator rotatably supported on the first unit and to be pressed against the second unit in association with a sliding movement of the second unit;
   a detection piece arranged on the actuator; and
   a sensor unit configured to detect a movement of the detection piece with the rotation of the actuator.

3. The driving device according to claim 2, wherein: the actuator includes:
a supporting point portion serving as a supporting point of the rotation,
a first arm portion extending in one direction from the supporting point portion and having the detection piece, and
a second arm portion extending in a direction different from the first arm portion;
the second unit includes a contacting portion arranged to face the second arm portion of the actuator; and
the contacting portion presses the second arm portion and the actuator is rotated in association with the sliding movement of the second unit, whereby the sensor unit detects the movement of the detection piece.

4. The driving device according to claim 3, wherein:
the contacting portion is arranged at a first position in a first state where the metal belt is so mounted between the drive shaft and the circumferential surface of the pulley as to extend in a first direction perpendicular to or substantially perpendicular to the extending direction of the drive shaft; and
the contacting portion is arranged at a second position where the second arm portion is pressed more than at the first position in a second state where the metal belt is so mounted between the drive shaft and the circumferential surface of the pulley that the inclination of the metal belt with respect to the drive shaft is inclined with respect to the first direction.

5. The driving device according to claim 2, wherein:
the sensor unit is capable of detecting the movement of the detection piece in a plurality of stages.

6. The driving device according to claim 5, wherein:
the sensor unit is composed of a plurality of optical sensors arranged along a moving direction of the detection piece.

7. The driving device according to claim 1, wherein:
the biasing member is a spring member extending in the direction connecting the drive shaft and the output shaft in the cross-section; and
one end of the biasing member is fixed to a first fixing portion of the first unit and the other end thereof is fixed to a second fixing portion arranged at a position of the second unit spaced apart from the first fixing portion in a direction from the drive shaft to the output shaft.

8. The driving device according to claim 1, wherein:
an outer diameter of the pulley is larger than that of the drive shaft.

9. The driving device according to claim 1, wherein:
the auxiliary transmission unit includes:
a first auxiliary transmitting portion fixed to the output shaft while being spaced apart from the pulley in an axial direction of the output shaft, and
a second auxiliary transmitting portion having a transmitting portion for transmitting the rotational drive force to the first auxiliary transmitting portion and a coupling portion arranged on the same axis as the transmitting portion while being radially spaced apart from the drive shaft at a side of the drive shaft opposite to the output shaft, and rotatably supported; and
the second unit is biased by the biasing member in association with the fracture of the metal belt, whereby the drive shaft is coupled to the coupling portion.

10. An image forming apparatus, comprising:
a driving device; and
an image bearing member to be driven and rotated by the driving device and configured to a carry a toner image on a surface;
wherein the driving device includes:
a motor including a drive shaft and configured to generate a rotational drive force;
a pulley in the form of a disk having a circumferential surface, including, in a central part thereof, an output shaft extending in parallel to the drive shaft and rotatably supported with the output shaft as a rotary shaft, the circumferential surface being arranged at a distance from the drive shaft in a radial direction of the rotation;
a metal belt mounted between the drive shaft and the circumferential surface of the pulley and configured to transmit the rotation of the drive shaft to the pulley by being driven and rotated;
a first unit configured to rotatably support the pulley;
a second unit configured to support the motor and slidable in a direction connecting the drive shaft and the output shaft in a cross-section intersecting with an axial direction of the drive shaft;
a biasing member configured to bias the second unit in a direction to move the drive shaft away from the output shaft in a state where the metal belt is mounted between the drive shaft and the circumferential surface of the pulley;
a detector configured to detect a change in an inter-axial distance between the drive shaft and the output shaft; and
an auxiliary transmission unit to be coupled to the drive shaft in association with a fracture of the metal belt and configured to transmit a rotational drive force of the drive shaft to the output shaft.

11. The image forming apparatus according to claim 10, wherein the detector includes:
an actuator rotatably supported on the first unit and to be pressed against the second unit in association with a sliding movement of the second unit;
a detection piece arranged on the actuator; and
a sensor unit configured to detect a movement of the detection piece with the rotation of the actuator.

12. The image forming apparatus according to claim 11, wherein:
the actuator includes:
a supporting point portion serving as a supporting point of the rotation,
a first arm portion extending in one direction from the supporting point portion and having the detection piece, and
a second arm portion extending in a direction different from the first arm portion;
the second unit includes a contacting portion arranged to face the second arm portion of the actuator; and
the contacting portion presses the second arm portion and the actuator is rotated in association with the sliding movement of the second unit, whereby the sensor unit detects the movement of the detection piece.

13. The image forming apparatus according to claim 12, wherein:
the contacting portion is arranged at a first position in a first state where the metal belt is so mounted between the drive shaft and the circumferential surface of the pulley as to extend in a first direction perpendicular to or substantially perpendicular to the extending direction of the drive shaft; and the contacting portion is arranged at a second position where the second arm portion is pressed more than at the first position in a second state where the metal belt is so mounted between the drive shaft and the circumferential surface of the pulley that the inclination of the metal belt with respect to the drive shaft is inclined with respect to the first direction.

14. The image forming apparatus according to claim 11, wherein:
the sensor unit is capable of detecting the movement of the detection piece in a plurality of stages.

15. The image forming apparatus according to claim 14, wherein:
the sensor unit is composed of a plurality of optical sensors arranged along a moving direction of the detection piece.

16. The image forming apparatus according to claim 10, wherein:
the biasing member is a spring member extending in the direction connecting the drive shaft and the output shaft in the cross-section; and
one end of the biasing member is fixed to a first fixing portion of the first unit and the other end thereof is fixed to a second fixing portion arranged at a position of the second unit spaced apart from the first fixing portion in a direction from the drive shaft to the output shaft.

17. The image forming apparatus according to claim 10, wherein:
an outer diameter of the pulley is larger than that of the drive shaft.

18. The image forming apparatus according to claim 10, wherein:
the auxiliary transmission unit includes:
a first auxiliary transmitting portion fixed to the output shaft while being spaced apart from the pulley in an axial direction of the output shaft, and
a second auxiliary transmitting portion having a transmitting portion for transmitting the rotational drive force to the first auxiliary transmitting portion and a coupling portion arranged on the same axis as the transmitting portion while being radially spaced apart from the drive shaft at a side of the drive shaft opposite to the output shaft, and rotatably supported; and
the second unit is biased by the biasing member in association with the fracture of the metal belt, whereby the drive shaft is coupled to the coupling portion.

* * * * *